US008698799B2

(12) United States Patent
Miller et al.

(10) Patent No.: US 8,698,799 B2
(45) Date of Patent: Apr. 15, 2014

(54) METHOD AND APPARATUS FOR RENDERING GRAPHICS USING SOFT OCCLUSION

(75) Inventors: Gavin S. P. Miller, Los Altos, CA (US); Nathan A. Carr, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1120 days.

(21) Appl. No.: 12/689,919

(22) Filed: Jan. 19, 2010

(65) Prior Publication Data
US 2013/0127895 A1    May 23, 2013

Related U.S. Application Data

(60) Provisional application No. 61/145,828, filed on Jan. 20, 2009.

(51) Int. Cl.
*G06T 15/40* (2011.01)

(52) U.S. Cl.
USPC ............................. 345/421; 345/419; 345/422

(58) Field of Classification Search
USPC .................................................. 345/421, 422
See application file for complete search history.

(56) References Cited

U.S. PATENT DOCUMENTS

| | | | |
|---|---|---|---|
| 5,854,631 A | 12/1998 | Akeley et al. | |
| 6,677,945 B2 | 1/2004 | Lapidous et al. | |
| 2007/0122027 A1* | 5/2007 | Kunita et al. | 382/154 |

OTHER PUBLICATIONS

Akeley, K., and Su, J. 2006. Minimum triangle separation for correct z-buffer occlusion. In GH '06: Proc. of the 21st ACM SIGGRAPH EUROGRAPHICS symposium on Graphics hardware, ACM, New York, NY, USA, ACM, 27-30.
Donnelly, W., and Lauritzen, A. 2006. Variance shadow maps. In I3D '06: Symposium on Interactive 3D graphics and games, ACM, New York, NY, USA, ACM, 161-165.
Grigoryan, G. and Rheingans, Penny 2004. Point-based probabilistic surfaces to show surface uncertainty. IEEE Transactions on Visualization and Computer Graphics 10,5,564-573.
Higham, N. J. 2001. Computing the nearest correlation matrix—a problem from finance. Published in 2002, IMA Journal of Numerical Analysis 22,329-343.
Rhodes, P. J., Laramee, R. S., Bergeron, R. D., and Sparr, T. M., 2003. uncertainty visualization methods in isosurface volume rendering.
Shannon, C. E. 1949. Communication in the presence of noise. Proceedings of the Institute of Radio Engineers 37, 10-21.

(Continued)

*Primary Examiner* — Xiao M. Wu
*Assistant Examiner* — Scott E Sonners
(74) *Attorney, Agent, or Firm* — Wolfe-SBMC

(57) ABSTRACT

Methods and apparatus for hidden surface removal with soft occlusion. Soft occlusion methods are described that treat surfaces as having a degree of uncertainty in depth. The soft occlusion methods may, for example, be used to remove artifacts from rendered images due to nearly coplanar surfaces or to render novel effects such as soft intersections between objects including consistent shadows and other global illumination effects. The soft occlusion methods may compute the 'expected' or average image given depth probability density functions. This has the effect of visually blending together surfaces that are close together in depth, leading to soft intersections. The computation of soft occlusion may be achieved analytically, for certain probability density functions, or stochastically. The stochastic soft occlusion methods extend the approach to a probability distribution of models, which allows for the effects of shadows and other global illumination effects to be included.

20 Claims, 10 Drawing Sheets

(56) References Cited

OTHER PUBLICATIONS

Umenhoffer, T., Szirmay-Kalos, L., and Szijártó, G. 2006. Spherical billboards and their application to rendering explosions. In GI '06: Graphics Interface 2006, Canadian Information Processing Society, Toronto, Ont., Canada, Canada, 57-63.

Whitted, T. 1980. An improved illumination model for shaded display. Commun. ACM 23,6,343-349.

Carpenter, L. 1984. The a-buffer, an antialiased hidden surface method. In Proc. SIGGRAPH '84, ACM, New York, NY, USA, ACM, 103-108.

Hofsetz, C., Ng, K., Chen, G., McGuinness, P., Max, N., and Liu, Y. Jul./Aug. 2004. Image-based rendering of range data with estimated depth uncertainty. IEEE Comput. Graph. Appl. 24, 4, 34-42.

Lapidous, E., and Jiao, G. 1999. Optimal depth buffer for low-cost graphics hardware. In HWWS '99: ACM SIGGRAPH/EUROGRAPHICS workshop on Graphics hardware, ACM, New York, NY, USA, ACM, 67-73.

Lapidous, E., Jiao, G., Zhang, J., and Wilson, T. 2001. Quasi-linear depth buffers with variable resolution. In HWWS '01: ACM SIGGRAPH/EUROGRAPHICS workshop on Graphics hardware, ACM, New York, NY, USA, ACM, 81-86.

Newell, M. E., Newell, R. G., and Sancha, T. L. 1972. A new approach to the shaded picture problem. In Proc. ACM National Conf., ACM, ACM.

Lanzagorta, M., and Uhlmann, J. 2005. Quantum rendering: an introduction to quantum computing, quantum algorithms and their applications to computer graphics. In SIGGRAPH '05: ACM SIGGRAPH 2005 Courses, ACM, 1.

\* cited by examiner

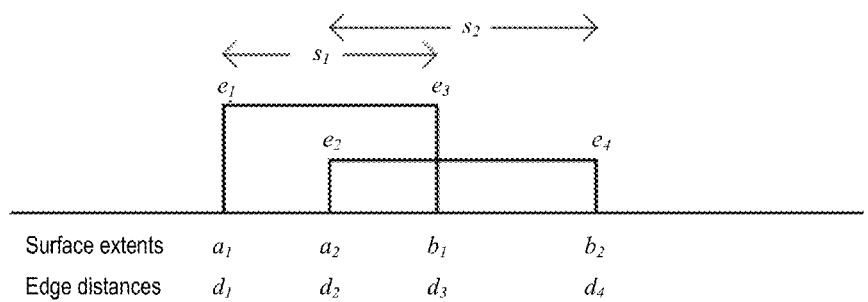
FIG. 6
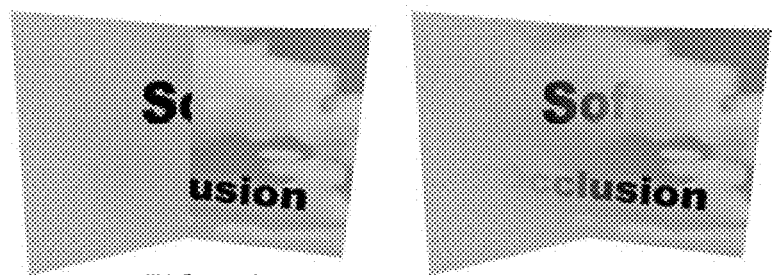
FIG. 7A
(Prior Art)
FIG. 7B

METHOD AND APPARATUS FOR RENDERING GRAPHICS USING SOFT OCCLUSION

PRIORITY INFORMATION

This application claims benefit of priority of U.S. Provisional Application Ser. No. 61/145,828 entitled "Method and Apparatus for Rendering Graphics using Quantum Occlusion" filed Jan. 20, 2009, the content of which is incorporated by reference herein in its entirety.

BACKGROUND

Description of the Related Art

Resolving surface occlusion is a fundamental problem in computer graphics, and is an operation that is at the core of any three-dimensional (3D) rendering system from GPU rasterization to high-end, production quality ray-tracers. Techniques for resolving depth ordering have been proposed; however, these techniques have problems with accuracy. A fundamental problem with these techniques is not just one of numerical precision, but the fact that ambiguities can be inherently present in the input data being rendered. For example, it is both permissible and easy to create perfectly co-planar overlapping surfaces in most 3D modeling systems, violating the notion that two objects cannot occupy the same space and time. Handling such ambiguities stably in a rendering system is of critical importance to avoid flickering artifacts on output.

Hidden Surface Algorithms

Conventional hidden surface algorithms employ one of a number of techniques to sort geometry into occlusion order. Such techniques may include object-space methods, such as Newell's algorithm, and image space methods, such as z-buffering. However, both of these conventional techniques suffer problems with coplanar polygons of different appearance.

Conventional object space algorithms work by sorting the collection of primitives with respect to the camera viewer, and then rendering them in back-to-front order. Classic problems arise in object-space methods in which primitives cannot be ordered properly without splitting them. One such event that requires splitting is when primitives intersect one another. It is also possible for a collection of non-intersecting primitives to mutually occlude one another in a cyclical pattern. Such visibility cycles must be broken for a correct ordering to be achieved. The operation of splitting primitives can be fraught with numerical issues. Such a case happens with nearly co-planar intersecting overlapping primitives. Perfectly co-planar primitives will have an indeterminate ordering that can lead to flickering during rendering.

Image-space methods such as z-buffering (or w-buffering) record a measure of distance from the viewer to the nearest surface through each pixel on the screen. This leads to one of two problems. For identical polygons (i.e., which share the same vertices), the draw order determines which surface is visible from the camera. For non-identical but almost co-planar polygons, quantization of the interpolated depth leads to fringe or noise artifacts known as z-fighting or z-tearing. Much work has gone into reducing z-tearing artifacts by better allocation over the depth range of the available z-buffer precision. The choice of z precision placement is highly scene-dependent and such schemes reduce, but do not eliminate, the frequency of tearing.

Uncertainty-Based Rendering

Some research has been directed at reconstructing surfaces from measured or scanned data. Such data inherently contains uncertainty; however, this research is directed at surface reconstruction and not at consistent rendering. Uncertainty-based rendering has been explored in the point-based rendering literature to visualize point measurements with known uncertainty using weighted splatting of Gaussian blobs. Uncertainty visualization has been used in volume rendering using a combination of iso-surface and point-based rendering and using color for volume rendering. Statistical descriptions of surface occlusions have been used to avoid aliasing in shadow maps, such as variance shadow maps, where a texture stores the mean depth and mean depth squared to allow for rapid computation of the mean and variance of depth within a region of the texture. This allows for pre-filtering to be applied to depth maps before computing fractions of pixels that are occluded by a given depth.

A z-based blending technique has been applied to overlapping fragments in the A-buffer algorithm. In a related area, the rendering of 2D billboards used for approximating volumetric effects was improved using a technique that computes distance along the camera rays from the planar billboard to the nearest opaque surface and uses this distance value to control how the billboard is blended into the scene to avoid clipping artifacts.

SUMMARY

Various embodiments of methods and apparatus for hidden surface removal with soft occlusion, in which surfaces are considered to have a probability distribution in depth, are described. These methods for hidden surface removal with soft occlusion may be referred to as soft occlusion methods. Embodiments of the soft occlusion methods treat surfaces as having a degree of uncertainty in depth. Embodiments of the soft occlusion methods avoid draw or storage order-dependence for rendered images. Embodiments of the soft occlusion methods may be used to remove artifacts from rendered images due to nearly coplanar surfaces, or to render novel effects such as soft intersections between objects including consistent shadows and other global illumination effects. Thus, embodiments of the soft occlusion methods may provide a visual alternative to implicit surface blending for intersecting objects for various applications such as decorative ornaments. Embodiments of the soft occlusion methods described herein are also referred to as "quantum occlusion" methods in provisional application Ser. No. 61/145,828.

Embodiments of the soft occlusion methods may compute the 'expected' or average image given the depth probability density functions. This has the effect of visually blending together surfaces that are close together in depth, leading to soft intersections. The computation of soft occlusion may be achieved analytically, for certain probability density functions, or stochastically. The stochastic soft occlusion methods extend the approach to a probability distribution of models, which allows for the effects of shadows and other global illumination effects to be included.

In a general method for soft occlusion according to some embodiments, two or more surfaces to be rendered may be obtained. At least one of the surfaces may occlude at least a portion of at least one other of the surfaces. Depth probability density functions are assigned to the surfaces. In some embodiments, a separate depth probability density function is assigned to each surface. An image is rendered from the two or more surfaces according to the depth probability density functions of the surfaces.

In some embodiments, to render an image from the two or more surfaces according to the depth probability density functions of the surfaces, the expected color contribution of each surface is computed according to the depth probability density functions of the surfaces. In some embodiments, a method for analytic soft occlusion may be used to compute the expected color contribution of each surface. In some embodiments, a method for stochastic soft occlusion may be used to compute the expected color contribution of each surface. The expected color contributions of the surfaces may then be summed to generate expected color for the image.

In a method for analytic soft occlusion that may be used in some embodiments to compute the expected color contribution of each surface according to the depth probability density functions of the surfaces, a set of intervals for which a number of overlapping surfaces is constant may be determined. The expected color contribution for each of the intervals may be analytically computed. The expected color contributions of the intervals may then be summed to generate the expected color contribution of the surface.

In a method for stochastic soft occlusion that may be used in some embodiments to compute the expected color contribution of each surface according to the depth probability density functions of the surfaces, multiple rays may be fired at each of a plurality of points in the image from a camera position. For each ray fired at each of the plurality of points, a random depth scale factor relative to the camera position for each surface intersected by the ray may be generated, and an expected color for the point may be calculated according to the random depth scale factors for this ray. In some embodiments, the generated random depth scale factor for a given ray may be different for at least two surfaces intersected by the ray. For each point on each surface of the image, the expected colors for each ray fired at this point may be averaged to generate an expected color contribution for this point.

In some embodiments, for each ray fired at each of the plurality of points, an analytic shadow value may be calculated for the point. For each point on each surface of the image, the shaded value for each ray fired at this point may be averaged to generate a shaded value for this point.

For some scenes to be rendered, two or more of the surfaces may be correlated. For scenes including correlated surfaces, a correlated random depth scale factor may be generated for each correlated surface intersected by the ray. In some embodiments, the correlated random depth scale factor for two correlated surfaces may be generated according to an entanglement value c, where c specifies a degree of correlation between the two correlated surfaces.

BRIEF DESCRIPTION OF THE DRAWINGS

FIG. 6 shows an example top-hat probability density functions for two surface fragments A and B.

FIG. 7A illustrates rendering with conventional hidden surface removal for reference.

FIG. 7B illustrates rendering with analytically computed soft occlusion, according to some embodiments.

Figure 1:
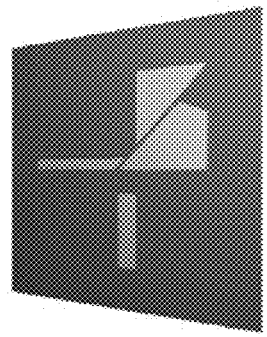
FIG. 1 illustrates the rendering of co-planar squares according to a conventional technique that exhibits classical hidden surface artifacts due to the z-fighting problem.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for hidden surface removal with soft occlusion, in which surfaces are considered to have a probability distribution in depth, are described. These methods for hidden surface removal with soft occlusion may be referred to as soft occlusion methods. Embodiments of the soft occlusion methods treat surfaces as having a degree of uncertainty in depth. In contrast to conventional uncertainty-based techniques, embodiments of the soft occlusion methods address a more general problem of handling the interaction of multiple near co-planar occluded surfaces. However, embodiments of the soft occlusion methods are generally applicable in rendering any opaque or semi-transparent occluded surfaces. Embodiments of the soft occlusion methods described herein are also referred to as "quantum occlusion" methods in provisional application Ser. No. 61/145,828.

In conventional rendering methods applied to opaque objects, the nearest surface is what is seen; the other surfaces are occluded or hidden. If the surfaces are made semi-transparent, a hard discontinuity is still seen where one surface is in front of another. If two surfaces intersect, a hard line is seen. In contrast, the soft occlusion methods as described herein, by treating surfaces as having a degree of uncertainty in depth, provide a transitional depth within which a visible surface is softly blended with other visible surfaces within the same region. Where objects intersect, the soft occlusion methods described herein provide a soft cross dissolve, rather than a hard line as produced by conventional hidden surface methods. Furthermore, the soft occlusion methods avoid the z-fighting problem of conventional hidden surface methods.

The soft occlusion methods as described herein may be used to provide a visual effect in graphics rendering. Soft occlusion may be used when approximating a shape with multiple surfaces to provide a soft way of blending the surfaces together. Soft occlusion may also be used to create the illusion of surfaces softly blended together, similar to implicit surface modeling but done in a different way than conventional implicit surface modeling techniques. The soft occlusion methods may be implemented in graphics rendering software or hardware to overcome the z-fighting problem in conventional graphics rendering where two coplanar or near-coplanar surfaces come together within the quantization level of the conventional rendering algorithms. In conventional graphics rendering algorithms, one surface wins, but which one wins depends on rounding errors in the algorithm, which results in artifacts such as patterns or stripes (see, for example, FIG. 1). Using the soft occlusion methods described herein, as two or more surfaces become indistinguishable in depth, the surfaces blend together.

Embodiments of the soft occlusion methods described herein may compute the 'expected' or average image given the depth probability density functions. This has the effect of visually blending together surfaces that are close together in depth, leading to soft intersections. The computation of soft occlusion may be achieved analytically, for certain probability density functions, or stochastically. The stochastic soft occlusion methods extend the approach to a probability distribution of models, which allows for the effects of shadows and other global illumination effects to be included. If the depth distributions are enlarged for artistic purposes, then embodiments of the soft occlusion methods can render a form of surrealism in which photorealistic lighting and textures are combined with non-conventional occlusion cues. Embodiments of the soft occlusion methods may, as an example, be used to visually blend together intersecting surfaces that naturally arise from some procedural modeling systems.

Embodiments of the soft occlusion methods may incorporate a conceptual framework for resolving issues related to the rendering of nearly coplanar surfaces. Rather than assuming that every surface depth from the viewer is precisely known, embodiments allow for a degree of uncertainty. Embodiments may model this uncertainty by assigning depth probability density functions to the surfaces. A result of this technique is that regions of ambiguous occlusion may smoothly blend with one another. The resulting rendered output is independent of the order in which surfaces are visited internally by the rendering system. This results in stable images over time that do not flicker due to depth aliasing.

Figure 18:
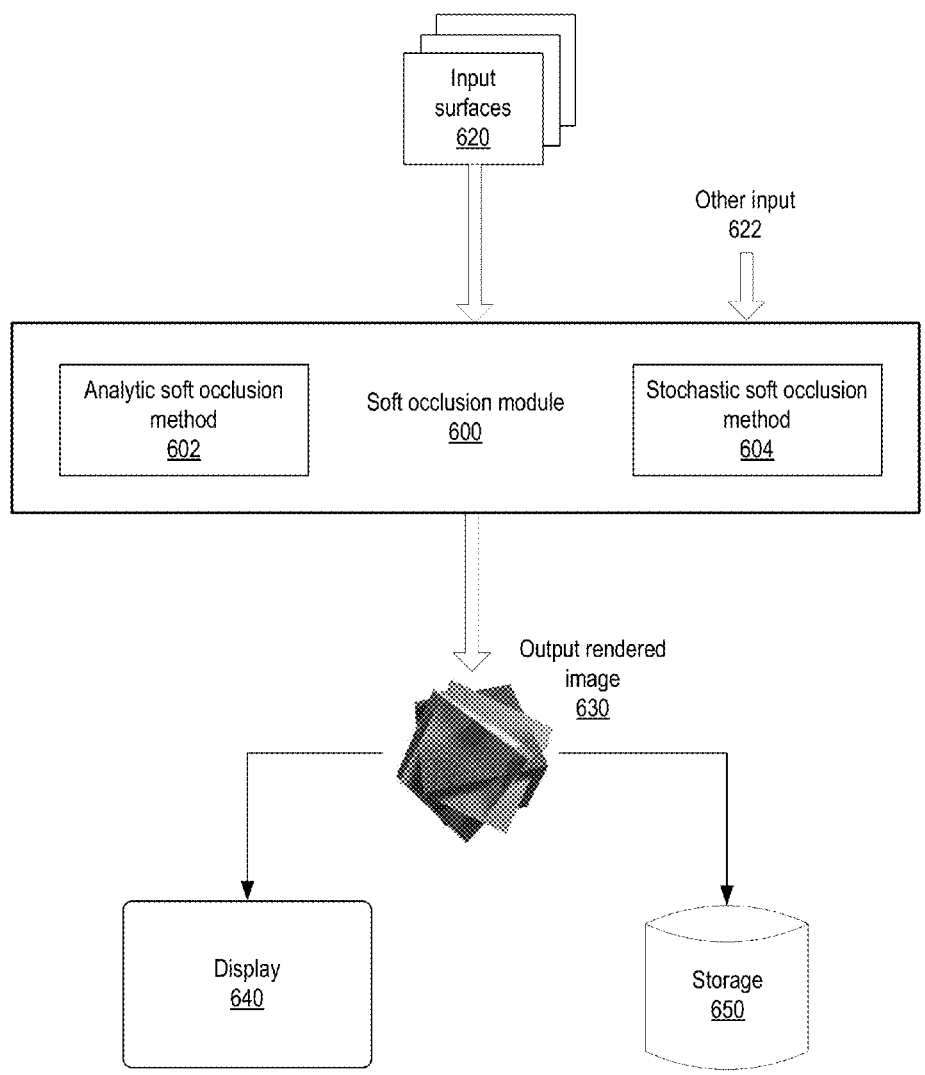
FIG. 18 illustrates an example soft occlusion module according to some embodiments.
Figure 19:
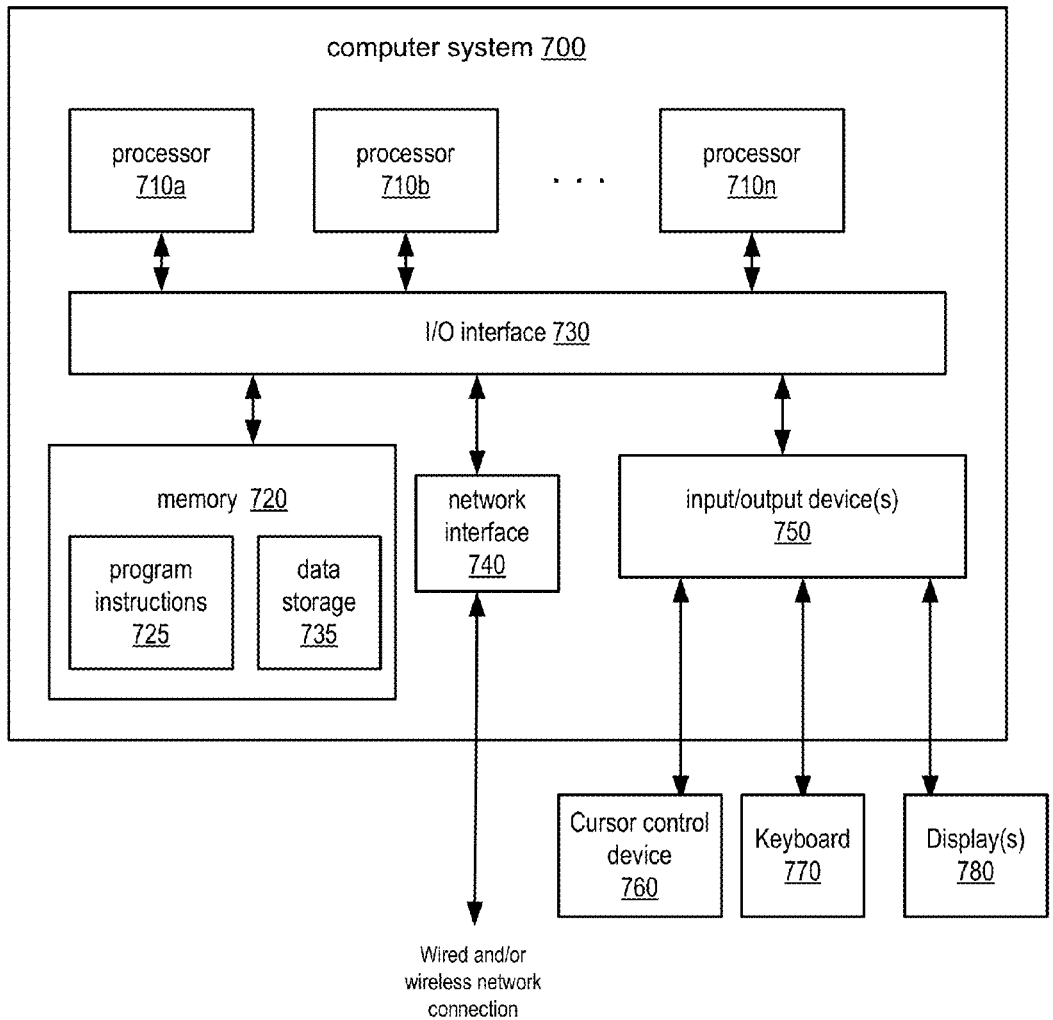
FIG. 19 illustrates an example computer system that may be used in embodiments.

The soft occlusion methods described herein may be implemented as or in a soft occlusion module. The soft occlusion module may be implemented as or in a stand-alone application or as a module of or plug-in for a graphics application or graphics library that may provide other graphical/digital image processing tools. Examples of types of applications in which embodiments of a soft occlusion module may be implemented may include, but are not limited to, scientific, medical, design (e.g., CAD systems), painting, publishing, digital photography, video editing, games, animation, and/or other applications in which 3D image rendering and/or processing may be performed. Specific examples of applications in which embodiments may be implemented include, but are not limited to, Adobe® Photoshop® and Adobe® After Effects®. The stochastic method of soft occlusion described herein may be incorporated into exiting ray-tracing software or hardware (GPU ray-tracing implementations). FIG. 18 illustrates an example soft occlusion module according to some embodiments. FIG. 19 illustrates a system in which embodiments of a soft occlusion module may be implemented.

While the soft occlusion methods are generally described herein in terms of software graphics renderers, in some embodiments, the analytic and/or stochastic soft occlusion methods described herein, or portions thereof, may be implemented by program instructions configured for execution on one or more graphics processing units (GPUs).

Analysis

Coplanar polygons are common in many models due to grid-based snapping in authoring tools. Sometimes techniques to address z-fighting include adding a secondary offset to z-values to resolve z-equal fragments. These enforce a visibility priority for equal depth fragments, but again may exhibit disturbing artifacts when small depth differences snap to equal and unequal depths based on quantization, when the visibility priority and the actual depth orders do not agree.

Draw-order-dependent rendering may lead to distracting artifacts if the planes are gradually moved away from each other. Below the precision of the z-buffer, the z-values round to the same depth values. As the separation increases, the true depth order will be resolved at some locations but not others, until finally all depths are resolved correctly. This may lead to an inverted occlusion order compared to the draw order when viewed from certain directions. The exact form of the noise depends on the details of the renderer.

Figure 2:
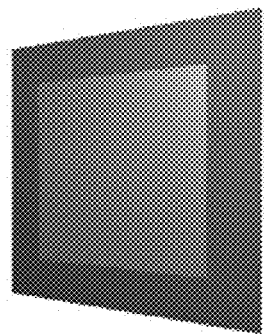
FIG. 2 illustrates the rendering of co-planar squares using soft occlusion, according to some embodiments.
Figure 3:
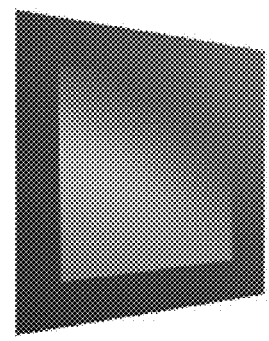
FIG. 3 illustrates the rendering of slightly inclined squares using soft occlusion, according to some embodiments.

FIGS. 1, 2 and 3 show aligned quadrilaterals rendered using different ray-tracing techniques for comparison. For the examples shown in FIGS. 1 through 3, two coplanar polygons are rendered using a space-partitioning tree in a ray-tracer. FIG. 1 illustrates the rendering of co-planar squares according to a conventional technique that exhibits classical hidden surface artifacts due to the z-fighting problem. FIG. 2 illustrates the rendering of co-planar squares using soft occlusion, according to some embodiments. FIG. 3 illustrates the rendering of slightly inclined squares using soft occlusion, according to some embodiments. Note that FIGS. 2 and 3 clearly show smooth or "soft" blending without the z-fighting artifacts evident in FIG. 1.

Criteria for a hidden surface algorithm may include, but are not limited to, the following:
1. The rendered image should depend only on the geometry of the scene, and not on the draw or storage order;
2. Small rigid displacements of the scene relative to the camera should not result in large variations in the computed image; and
3. The rendered image should display the result of classical hidden surface removal when the depths of two surfaces are resolvable by the numerical precision of the renderer.

Criterion 2 requires of depth changes what conventional anti-aliasing provides for translations in the image plane. Conventional z-buffering fails criteria 1 and 2 but passes criterion 3, as does ray-tracing and other known surface rendering techniques. A problem at the core of conventional rendering techniques is the desire to compute the color of the nearest surface of a list of fragments. When the sampling precision of the depth values fails to adequately represent the differences between surface depths, quantization snaps the depths to the same depth value, leading to draw-order dependencies.

In conventional signal processing, for a signal to be adequately represented by a discrete array of samples, it must be pre-filtered to avoid aliasing. Such pre-filtering allows for the low-pass-filtered signal to be exactly represented by a discrete array of samples. As with criterion 2, a uniform shift in the location of the samples has no effect on the ability to reconstruct the signal. For the sorted fragment color problem, however, such a pre-filtering technique is not available in conventional signal processing, although work has been done on adding noise to detect small signals, which in graphics is applied as dithering. The problem of quantized-depth fragment sorting may be visualized using a 'sorted-color diagram' in which the result of quantizing the depth of two fragments and then placing the color of the nearer fragment (or the second surface if equal in quantized depth) is placed on the diagram.

Figure 4:
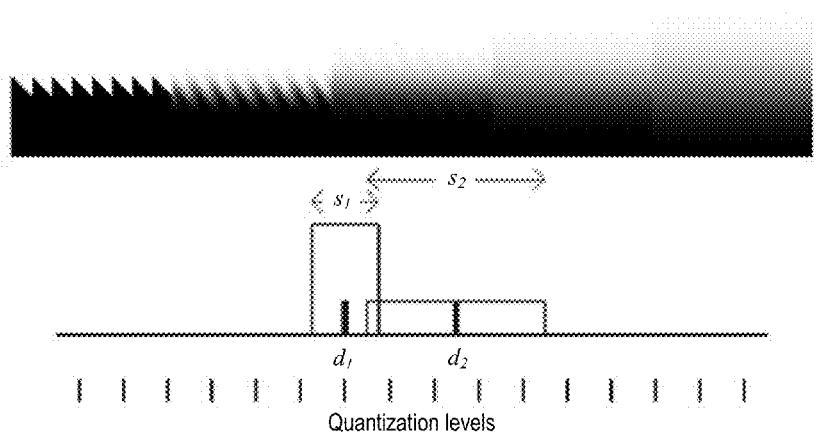
FIG. 4 illustrates an array of sorted color diagrams representing the color of two surfaces rendered with hidden surface removal based on depth, and in which cosine-distributed noise is added to the depths before they are quantized.

FIG. 4 illustrates an array of sorted color diagrams representing the color of two surfaces rendered with hidden surface removal based on depth, and in which cosine-distributed noise is added to the depths before they are quantized. In FIG. 4, the horizontal axis represents the depth of the first fragment $d_1$, and the vertical axis represents $d_2$-$d_1$. The panels show increasing added cosine-distributed noise up to an amplitude of two. When no noise is added, the sorted-color diagram exhibits a jagged appearance due to the quantization of one depth value before comparison to the second depth value. By adding a random offset to the two depths before quantization and comparison, the variation with absolute depth position (the horizontal axis) is removed, and the resultant color only depends on the difference between the depths. For an ideal infinite precision algorithm, the result would be a Heaviside step function as a function of the difference of the depths. For the quantized system with additive noise of an amplitude of two quantization steps, the step function becomes a more sigmoidal shape, meaning that the fragment colors will blend together smoothly as the depths approach within the noise or 'uncertainty' envelope.

In general, representing depths by distributions allows for signal processing to be applied to the representation, and embodiments are described in which such techniques may be extended to direct occlusion computations including avoiding z-fighting artifacts, rendering when depth values have some degree of known uncertainty, and to depth-aware compositing. Some embodiments may use stochastic sampling for rendering motion blur in which the position of models are set based on a randomized time value before intersection with each ray. In the case of motion blur, the motions of the objects may all be directly correlated with the time parameter, and the motions may be arbitrary leading to blurring in the image plane. Some embodiments of the soft occlusion methods may include techniques that avoid in-plane blurring while providing soft intersections and remove z-fighting artifacts.

The following describes a formulation of soft occlusion in terms of depth probability distributions, and describes how the expected image may be computed analytically for certain classes of probability density functions. A description is then provided of how this technique may be applied using a form of stochastic sampling that applies to a broader class of distributions and that allows for a broader range of visual effects. The use of soft entanglement to provide additional control over the appearance of intersections is also described. Results of renderings performed according to embodiments of the soft occlusion methods, provided in the accompanying Figures, are also described.

Soft Occlusion

Embodiments of a soft occlusion method may recast the sorted fragment color problem in terms of probability distributions. Each surface fragment location is encoded as a probability density function. The nearest-color problem then becomes a matter of computing the expected color of the sorted set, based on the color of each fragment weighted by the probability that it is the closest surface. For analytic purposes, it is assumed that the appearance of each fragment is constant within the range of depths of the distribution function. Equation 1 shows that the expected color for the image is the sum of the expected color for each fragment, while Equation 2 shows how to compute the expected color contribution of a particular fragment:

$$E = \sum_{j=1}^{N} E_j \tag{1}$$

$$E_j = \int_{a_j}^{b_j} p_j(t) I_j v_j(t) \, dt \tag{2}$$

where $E_j$ is the expected color of surface j, $p_j(t)$ is the probability of surface j being at depth t, $a_j$ and $b_j$ are the non-zero range of $p_j(t)$, $v_j(x)$ is the probability that surface j will be unoccluded by the other surfaces at depth x, and $I_j$ is the color of the surface fragment.

When the probability distributions of the surfaces are uncorrelated, then $v_j(x)$ may be evaluated using Equation 3:

$$v_j(t) = \prod_{i=1}^{N} \left(1 - \int_{z=a_i}^{t} p_i(z) \, dz\right) \tag{3}$$

where N is the number of surfaces whose probability density functions are non-zero in the interval 0 to $b_j$ excluding j.

Given this formulation, conventional hidden surface algorithms can be seen to represent the probability density function of the surface depth using a Dirac delta function. The inability to accurately represent the location of a Dirac delta function with depth values of finite numerical precision leads to z-fighting artifacts.

In some embodiments, pre-filtering of the depth signal to avoid aliasing may be achieved by convolution of the corresponding probability density function along the ray with a point spread function. The probability density function for each surface may need to be broadened to at least the quantization step size for the sampled depth representation. When the probability density function is wide relative to the quantization step size of the depth representation, the expected nearest color is nearly independent of the origin of the z-samples, which fulfills criterion 2 above. When the nearest probability density function does not overlap the next-nearest probability density function, the color converges to the color of the nearest surface from conventional rendering, which fulfills criterion 3 above.

For two nearly coplanar surfaces, irresolvable by the uncertainty of the depth samples, the expected sorted color is merely an average of the two colors, as is illustrated in FIG. 2. If several surfaces are coplanar, the color will be the average of the surface colors. As the surfaces move apart they will smoothly transition to the result of conventional z-buffering as expected. Two surfaces slightly inclined to each other yield a smooth transition region as illustrated in FIG. 3.

Methods for Soft Occlusion

Figure 5A:
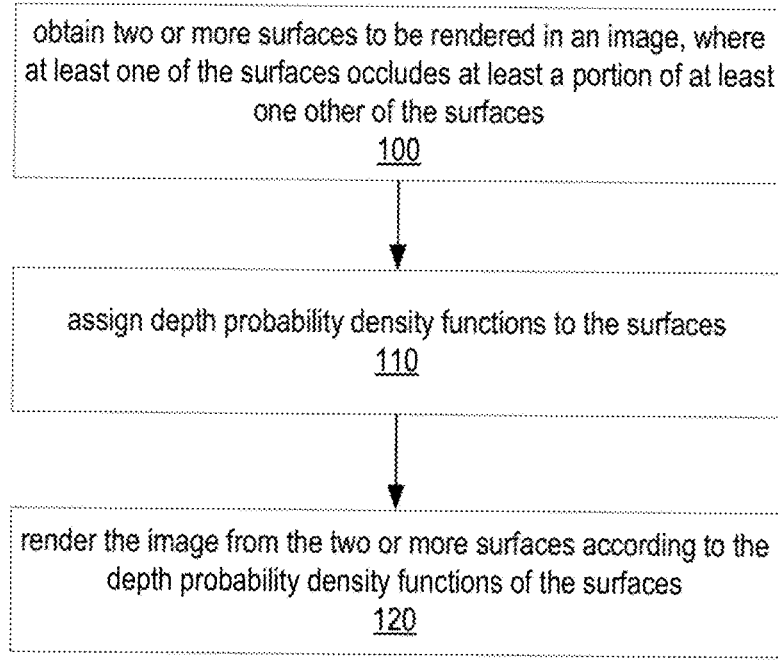
FIGS. 5A and 5B are flowcharts that illustrate an example general method for soft occlusion, according to some embodiments.
Figure 5B:
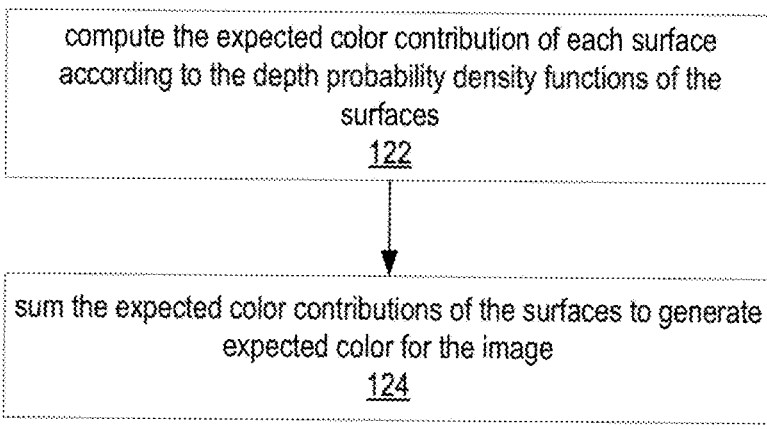

FIGS. 5A and 5B are flowcharts that illustrate an example of a general method for soft occlusion, according to some embodiments. In FIG. 5A, as indicated at 100, two or more surfaces to be rendered may be obtained. At least one of the surfaces may occlude at least a portion of at least one other of the surfaces. As indicated at 110, depth probability density functions are assigned to the surfaces. In some embodiments, a separate depth probability density function is assigned to each surface. As indicated at 120, an image is rendered from the two or more surfaces according to the depth probability density functions of the surfaces.

Figure 9:
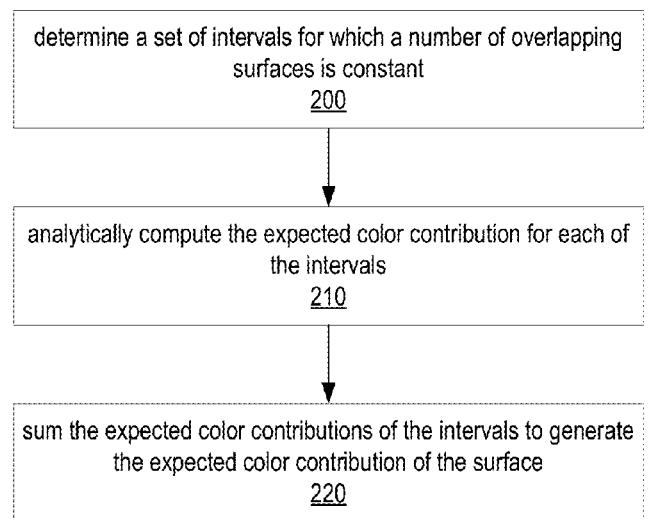
FIG. 9 is a flowchart illustrating a method for analytic soft occlusion, according to some embodiments.
Figure 16:
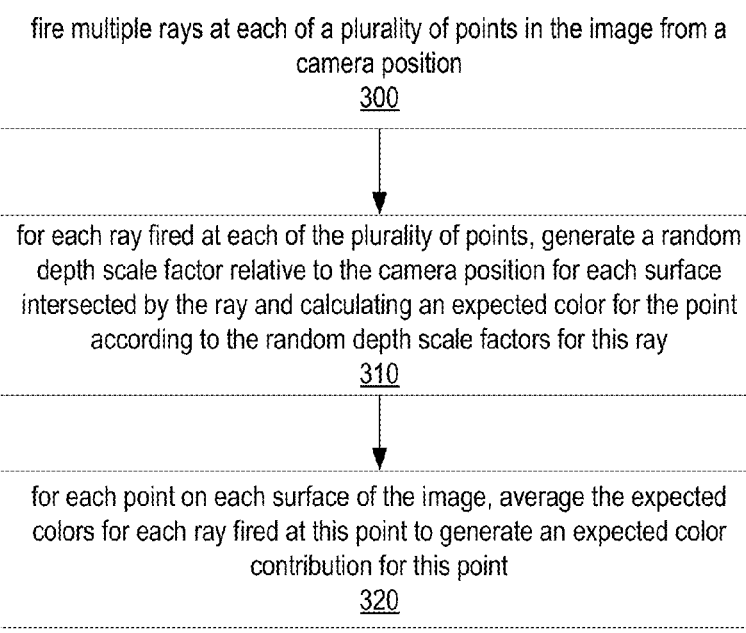
FIG. 16 is a flowchart illustrating a method for stochastic soft occlusion, according to some embodiments.

FIG. 5B is a flowchart that provides details of element 120 of FIG. 5A. As indicated at 122, the expected color contribution of each surface is computed according to the depth probability density functions of the surfaces. In some embodiments, a method for analytic soft occlusion may be used to compute the expected color contribution of each surface. An example of an analytic soft occlusion method is shown in FIG. 9. In some embodiments, a method for stochastic soft occlusion may be used to compute the expected color contribution of each surface. An example of a stochastic soft occlusion method is shown in FIG. 16. As indicated at 124, the expected color contributions of the surfaces may be summed to generate expected color for the image.

Analytic Soft Occlusion Method

Given Equations 1 and 2, it is possible to compute the expected color for a surface analytically for certain simple probability density functions. For example, suppose that each probability density function is in the form of a top-hat function, for which the probability density function has a constant value from $a_i$ to $b_i$ and is zero elsewhere. FIG. 6 shows an example top-hat probability density functions for two surface fragments A and B. It is the case that:

$$1 - \int_{z=a_i}^{t} p_i(z) \, dz = A_i t + B_i \tag{4}$$

where:

$$A_i = \frac{a_i}{a_i - b_i}, \; B_i = \frac{b_i \alpha_i}{b_i - a_i} \tag{5}$$

where $\alpha_i$ is the total probability of the surface occurring between $a_i$ and $b_i$, which for opaque surfaces is one, and for semitransparent surfaces would be equal to the opacity of the surface.

For these top-hat probability density functions, Equation 2 becomes:

$$v_j(t) = \prod_{i=1}^{N} (A_i t + B_i) \tag{6}$$

and:

$$E_j = \sum_{k=1}^{K} F_j(k) \tag{7}$$

When K is the number of spans within the range of the probability density function for surface j, then:

$$F_j(k) = \frac{\alpha_j}{b_j - a_j} I_j \int_{d_k}^{d_{k+1}} \left(\prod_{i=1}^{N} (A_i t + B_i)\right) dx \tag{8}$$

When the number of overlapping density functions within a range of depth values (excluding j) is equal to zero, then Equation 8 becomes:

$$F_j(k) = \frac{\alpha_j}{b_j - a_j} I_j (d_{k+1} - d_k) \qquad (9)$$

When the number N of overlapping density functions within a range of depth values (excluding surface j) is equal to one, then:

$$v_j(t) = A_0 t + B_0 \qquad (10)$$

and Equation 8 becomes:

$$F_j(k) = \frac{\alpha_j}{b_j - a_j} I_j \left( \frac{A_0}{2}(d_{k+1}^2 - d_k^2) + B_0(d_{k+1} - d_k) \right) \qquad (11)$$

For N larger than one, Equation 8 may be expanded into a polynomial of degree N and integrated analytically. For large values of N, the number of coefficients becomes impractically large, and it may be better to perform a numerical integration. For many scenes, most pixels may be represented with analytic terms up to N=2 (which corresponds to regions where up to three surfaces overlap in depth) and then numerical integrals used for higher order intervals.

Given the equations for numerical integration of intervals for which the number of overlapping regions is constant, an algorithm to compute expected visible color may be derived. For each surface, embodiments of the algorithm compute a set of intervals for which the overlap count is constant. Embodiments of the algorithm may compute the expected color for each of these intervals using Equation 8 and then add them together. Pseudocode for a more rigorous definition is given by Algorithm 1, an analytic soft occlusion algorithm, shown below. Note that this algorithm is given by way of example, and is not intended to be limiting. Comments are indicated by '//':

---

Algorithm 1: analytic soft occlusion

```
E                                    // list of extents sorted in
                                        increasing depth
// current set of overlapping surfaces
L ← ∅                                // set of leading overlapping
                                        surfaces
cumulativeT ← 1.0
occludingT ← 1.0
totalRadiance ← vector3(0,0,0)
for i = 0 to |E| do
    s_i ← E_i.getAssociatedSurface( )
    if E_i.isLeadingExtent( ) the
        O ← L                        // initialize with leading extents
        occludingT ← cumulativeT
        radiance ← s_i.getRadiance( )
        for j = i + 1 to |E| do
            ip ← computeIntegralProbability(O,E,j)
            totalRadiance += occludingT * radiance * ip
            s_j ← E_j.getAssociatedSurface( )
            if E_j.isLeadingExtent( ) then
                O = O ∪ s_j          // add s_j to O
            else
                occludingT *= s_j.getTransparency( )
                if s_j = s_i then
                    break            // ends interval for s_i
                end if
                O ← O \ s_j          // remove s_j from O
            if occludingT = 0 then
```

---

Algorithm 1: analytic soft occlusion

```
                break                // s_i is completely occluded
            end if
        end if
    end for
    L ← L ∪ s_i                      // add s_i to L
    else                             // E_i is a trailing extent
        cumulativeT *= s_i.getTransparency( )
        if cumulativeT = 0 then
            break                    // remaining surfaces are occluded
        end if
        L ← L \ s_i                  // remove s_i from L
    end if
end for
end analytic soft occlusion algorithm
```

---

A probability distribution of bounded range is considered to have an extent at each end of the depth interval. A sorted extent list may be traversed incrementally, building the set of overlapping probability density functions along with an occluding transparency value for spans already processed, and the expected colors are computed analytically. The subroutine computeIntegralProbability in algorithm 1 evaluates equation 8 given the span and set of overlapping surfaces for the span.

Figure 8:
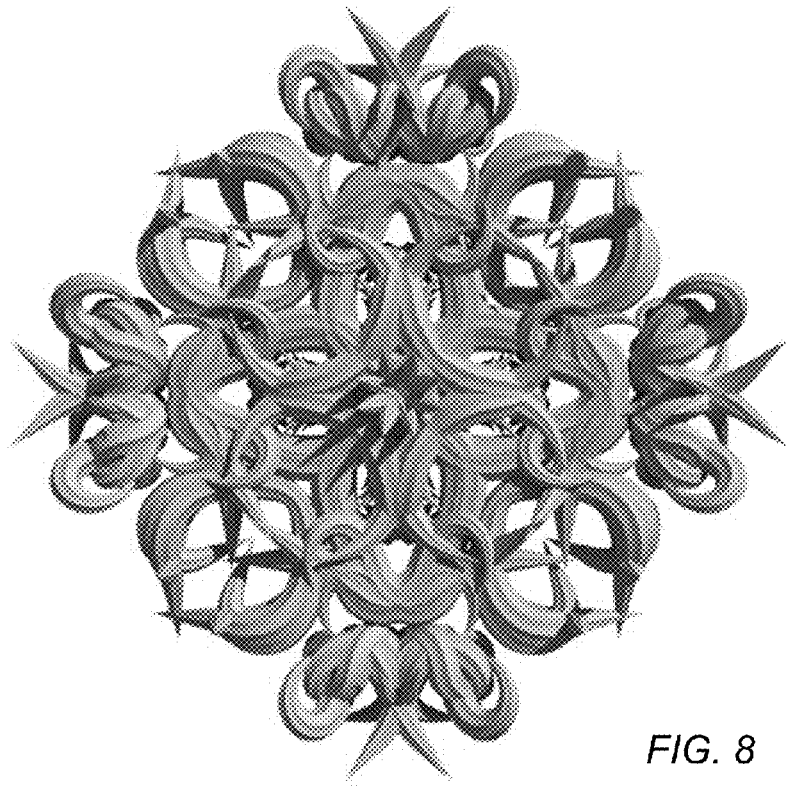
FIG. 8 shows an example ornament rendered using analytic soft occlusion, a point light source and irradiance gather, according to some embodiments.

FIGS. 7A and 7B illustrate rendering of two textured intersecting planes. FIG. 7A illustrates rendering with conventional hidden surface removal for reference. FIG. 7B illustrates rendering with analytically computed soft occlusion, according to some embodiments. In FIG. 7B, the textures dissolve into each other as expected without artifacts or noise. A more complex example is shown in FIG. 8, which shows an example ornament rendered using analytic soft occlusion, a point light source and irradiance gather, according to some embodiments. The complex self-intersecting decorative ornament shows blending between multiple intersecting pieces.

To check the accuracy of the analytic algorithm, a second approach, called depth jittering, may be taken in which the surface intersections with a ray are computed once and then random offsets added in accordance with the probability density function for each surface and the color of the nearest surface added to a running total. Upon performing this test, the resulting average color agrees closely with the analytic model when several hundred variations are averaged together. Depth jittering is a simple way to implement a broader class of depth distributions than can be computed analytically. For FIG. 8, each surface point was displaced towards the camera before computing shadows from undisplaced geometry. The shift is by an amount equal to the largest relative depth uncertainty. This approximation introduces only a small error for opaque surfaces but may re-introduce z-fighting for layered transparent surfaces.

FIG. 9 is a flowchart illustrating a method for analytic soft occlusion, according to some embodiments, that may be used in computing the expected color contribution of each surface according to the depth probability density functions of the surfaces (see element 122 of FIG. 5B). As indicated at 200, a set of intervals for which a number of overlapping surfaces is constant may be determined. As indicated at 210, the expected color contribution for each of the intervals may be analytically computed. As indicated at 220, the expected color contributions of the intervals may be summed to generate the expected color contribution of the surface. For an example of a more detailed implementation of the method of FIG. 9, see algorithm 1, given above.

Stochastic Soft Occlusion Method

In graphics, numerical integrals may be evaluated for motion-blurred scenes using stochastic sampling. For motion blur, each ray is jittered in time and the ray then intersected with the corresponding transformed geometry due to animation in the scene at that time. Averaging over a large number of rays results in a smooth motion-blurred appearance, with correct global illumination effects such as proper behavior at intersections and motion-blurred shadows. The scene is effectively the summation of a large number of images at different instances in time each rendered without motion blur. Each ray freezes the scene at a particular moment in time. The weighted average of many rays approximates the image-integral during the exposure. A particularly efficient special case is when the motion in the scene is piecewise rigid. In that case each rigid object may be stored in its own local coordinate system (with the corresponding ray-intersection acceleration data-structure) and only the transformations are recomputed for each ray. In effect each animated transformation is replaced with a transformer that can compute a transformation on the fly for each ray, which is turn is used to transform the ray into the local coordinate system of the rigidly animating surface. The conservative world space bounds of the rigid surfaces are stored in a hierarchical bounding volume which is traversed by rays which are then transformed into the local space of the leaves of the tree that store the rigid surfaces.

In some embodiments, a similar approach may be applied to compute soft occlusion. For a given ray, each surface point is fixed at a position based on its probability. For piecewise rigid motions, this becomes equivalent to selecting the rigid-body transformation for each piece of geometry based on its probability distribution function, and then intersecting the ray with the geometry using conventional ray-tracing. Secondary rays use the same transformations as the primary ray that generated them so that shadows and other effects are consistent with that geometrical configuration. A method to implement such a system that may be used in some embodiments is to give each primary ray a pseudo-random key and then to compute random transformations for each object based on hashing the primary ray key with a fixed object key. The resulting uniformly distributed pseudo-random number is used to randomly distribute the geometry's transformation in accordance with a probability distribution function. Other methods than the pseudo-random key method may be used in some embodiments.

In the above section titled Analytic Soft Occlusion, probability density functions are expressed as a random offset along the ray before occlusion is computed. For piece-wise rigid transformations, however, this is not expressible as a rigid body transformation in the case of perspective cameras. Instead, a transformation may be generated that scales the geometry radially centered on the camera. This may prevent individual objects from being blurred while allowing for soft occlusion for the intersection with other objects. Unlike the analytic model from the previous section, embodiments of a stochastic, zoom-based soft occlusion model may have a probability density width, i.e. spatial uncertainty, that is linear with the distance from the camera. For isolated objects this may approximate spatially invariant uncertainty if the size of the object is small relative to the distance to the camera. This approach may be used for embodiments of transformer-based soft occlusion methods as described herein. When using small amounts of soft uncertainty to resolve z-fighting issues, this distance-dependent uncertainty may be suited for systems that represent depths using floating-point numbers since the quantizing error depends on the magnitude of the number. However, for images with large uncertainty values used for artistic effects, this distance dependent uncertainty may not be as well suited for extensive scenes.

Figure 10:
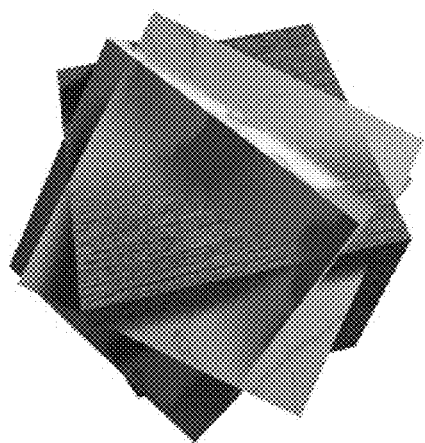
FIG. 10 shows three textured intersecting cubes rendered with stochastic soft occlusion including shadows, according to some embodiments.
Figure 11:
FIG. 11 shows a candlestick with conventional hidden surface rendering with global illumination.
Figure 12:
FIG. 12 shows the candlestick rendered using soft occlusion with a small amount of uncertainty to create fine-scale blending at intersections, according to some embodiments.
Figure 13A:
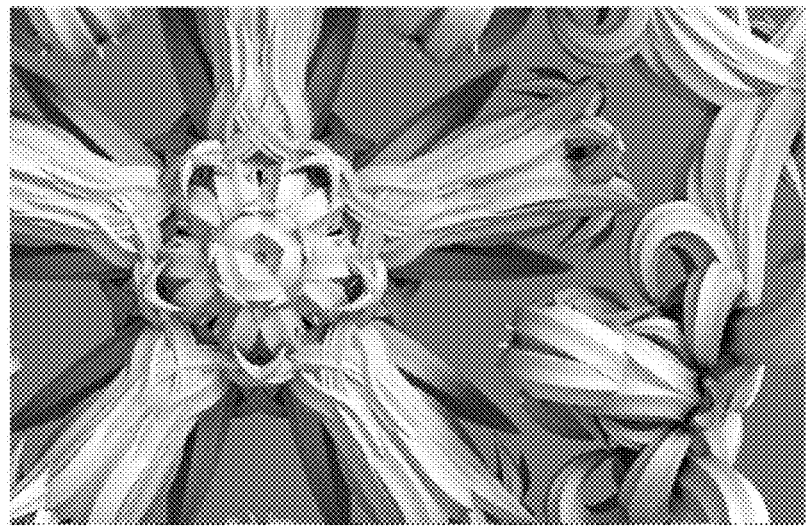
FIG. 13A shows multiple intersecting generalized cylinders rendered using a conventional occlusion technique.
Figure 13B:
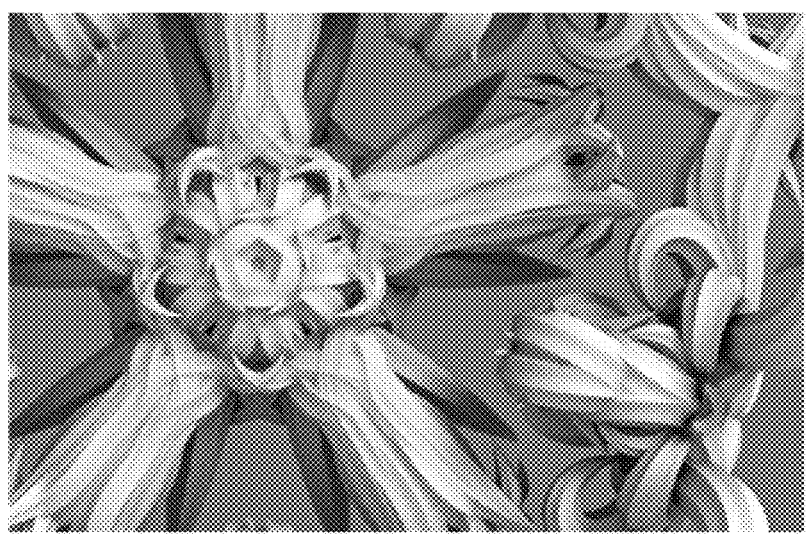
FIG. 13B shows the multiple intersecting generalized cylinders of FIG. 13A rendered using stochastic soft occlusion, and illustrates subtle use of stochastic soft occlusion on fine surface detail, according to some embodiments.
Figure 14:
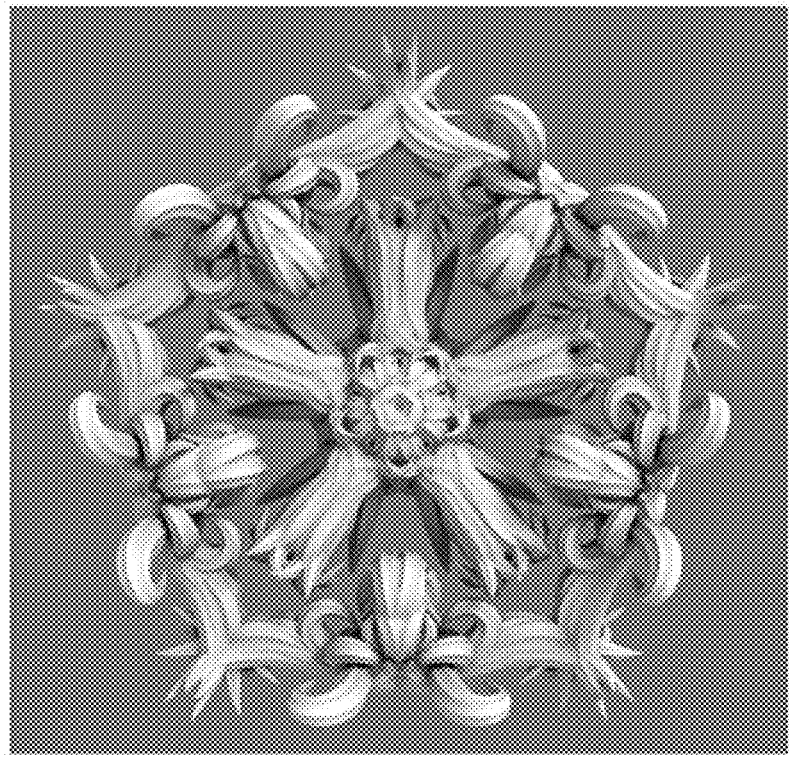
FIG. 14 illustrates a decorative ornament rendered with fine-scale soft occlusion, according to some embodiments.
Figure 15:
FIG. 15 illustrates rendering of a decorative bowl that combines stochastic soft occlusion with a depth of field effect, according to some embodiments.

FIG. 10 shows three textured intersecting cubes rendered with stochastic soft occlusion including shadows, according to some embodiments. Note that the shadows produced are not perfectly sharp since they are effectively motion-blurred towards and away from the camera. However, since the image is the equivalent of the average of many different conventionally-rendered models with correct shadows, the image is otherwise consistent in its global illumination. A further example of rendering with stochastic soft occlusion is shown in FIGS. 11 and 12. FIG. 11 shows a candlestick with conventional hidden surface rendering with global illumination. FIG. 12 shows the candlestick rendered using soft occlusion with a small amount of uncertainty to create fine-scale blending at intersections, according to some embodiments. Despite the object having considerable extents in depth, the effects of soft occlusion, as shown in FIG. 12, are still visually pleasing without obvious artifacts except for a slight softening of cast shadows. FIGS. 13A and 13B and FIG. 14 illustrate subtle use of stochastic soft occlusion on fine surface detail. FIGS. 13A and 13B compare conventional occlusion (FIG. 13A) and soft occlusion (FIG. 13B) according to some embodiments for multiple intersecting generalized cylinders. FIG. 14 illustrates a decorative ornament rendered with fine-scale soft occlusion, according to some embodiments. FIG. 15 illustrates rendering of a decorative bowl that combines stochastic soft occlusion with a depth of field effect, according to some embodiments.

FIG. 16 is a flowchart illustrating a method for stochastic soft occlusion, according to some embodiments, that may be used in computing the expected color contribution of each surface according to the depth probability density functions of the surfaces (see element 122 of FIG. 5B). As indicated at 300, multiple rays may be fired at each of a plurality of points in the image from a camera position. As indicated at 310, for each ray fired at each of the plurality of points, a random depth scale factor relative to the camera position for each surface intersected by the ray may be generated, and an expected color for the point may be calculated according to the random depth scale factors for this ray. In some embodiments, the generated random depth scale factor for a given ray may be different for at least two surfaces intersected by the ray. As indicated at 320, for each point on each surface of the image, the expected colors for each ray fired at this point may be averaged to generate an expected color contribution for this point.

In some embodiments, for each ray fired at each of the plurality of points, an analytic shadow value may be calculated for the point. For each point on each surface of the image, the shaded value for each ray fired at this point may be averaged to generate a shaded value for this point.

For some scenes to be rendered, two or more of the surfaces may be correlated. For scenes including correlated surfaces, a correlated random depth scale factor may be generated for each correlated surface intersected by the ray. In some embodiments, the correlated random depth scale factor for two correlated surfaces may be generated according to an entanglement value c, where c specifies a degree of correlation between the two surfaces. In some embodiments, c is variable within a range of 0.0 to 1.0 to specify the degree of correlation between the two surfaces. Correlated surfaces are further discussed in the section titled Entangled Soft Occlusion.

Entangled Soft Occlusion

In the above discussion, surfaces have generally been considered to have random transformation distributions that are uncorrelated with other surfaces. However, it is possible for two ray-surface intersections to occur for pieces of the same object. If the distributions are uncorrelated, then a further-back surface may occlude nearer surfaces from the same object. This may lead to artifacts on object silhouettes and on thin surfaces for analytic soft occlusion. In some embodiments, the effects of these problems may be reduced by using back-face culling when rendering. Alternatively, for stochastic soft occlusion, in some embodiments the transformation distribution functions may be forced to be correlated for rays intersecting the same object.

In some embodiments, for perfect correlation between intersections, the same randomly distributed scale factor may be used for all rays for correlated objects intersecting the same ray. (In the case of rigid-body transformations of objects, all intersections with those objects will be perfectly correlated.) When such an object intersects itself, it will show a hard intersection, but will blend smoothly into the other objects with which it is uncorrelated.

In some embodiments, the ability to control the degree of correlation between different objects may add another degree of artistic control to images rendered with soft occlusion. The random offsets of two surfaces are highly correlated if they are 'entangled'. Highly entangled collections of surfaces may maintain their original appearance no matter how large the width of the probability density function, provided that they only occlude and intersect with each other.

In some embodiments, two surfaces may be specified using an entanglement value c between zero and one inclusive, where c is a desired correlation of their normally distribution random parameters. When more than two objects are entangled, c becomes a desired correlation matrix C between the random parameters, where the diagonals of C are one and the off-diagonal elements store the corresponding desired correlations. If C is both symmetric and positive definite, then a set of correlated random numbers can be generated from an uncorrelated set of normalized Gaussian random numbers as follows:

$$C=LL^T \quad (12)$$

where L is a lower triangular matrix with positive diagonal entries resulting from the Cholesky factorization of C. Given a vector g of normally distributed Gaussian random numbers, a set of correlated random numbers g' can be generated from the correlation matrix C by applying the transform g'=Lg. It is possible to specify correlation matrices that are inconsistent, in which not all of the correlations can be satisfied at the same time. However, techniques exist for finding a nearest valid correlation matrix. For entanglement values close to one, z-fighting artifacts can be re-introduced.

In some embodiments, once per frame, a list of n entangled transformers are stored by an entangler object. A corresponding n×n correlation matrix is specified, and the entangler applies the Cholesky factorization algorithm based on the nearest valid correlation matrix. For each ray, if an entangled transformer is encountered by a ray, the entangler is invoked to compute the corresponding random numbers for its list of transformers. If two transformers from the same entangler are encountered by the same ray (i.e., with the same pseudo-random value), then it is not necessary to recompute the correlated random numbers for the entangler. Some embodiments may provide several entangler objects for which corresponding lists form distinct sets from one another.

Figures 17A, 17B:
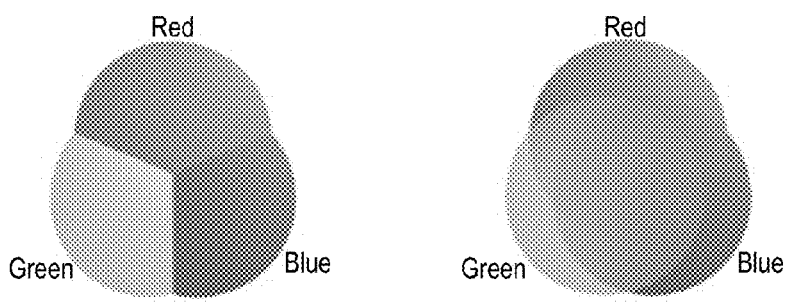
FIGS. 17A through 17D illustrate entangled soft occlusion, applied at different levels of entanglement, to three inclined disks, according to some embodiments.
Figures 17C, 17D:
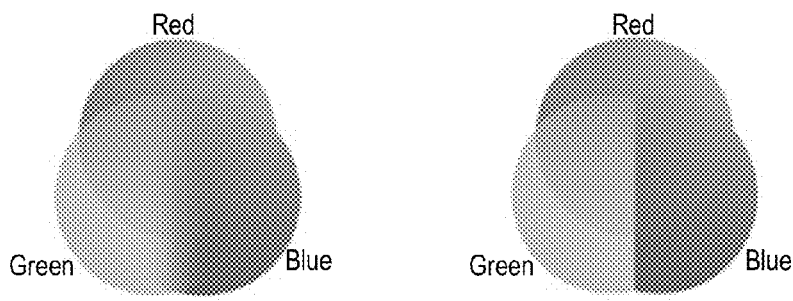

An example application of entanglement as described above involves controlling the appearance of intersections between several mutually intersecting objects. In general, surfaces that are entangled show smaller, crisper regions of intersections than those that are not entangled for the same angle of intersection. FIGS. 17A through 17D illustrate entangled soft occlusion, applied at different levels of entanglement, to three inclined disks, according to some embodiments. The three inclined disks intersect at a shallow angle; one disk is red, one green, and one blue (in FIGS. 17A through 17D, the disks are shown in shades of grayscale). As shown in FIG. 17A, rendering with zero uncertainty (entanglement value c=0) yields hard intersection lines. As shown in FIG. 17B, the introduction of some level of uncertainty (c>0) results in a smooth blending of the colors of the three disks. FIGS. 17C and 17D illustrate the effect of entangling just the blue and green disks together. In FIG. 17C, an entanglement level c of 0.8 is used; in FIG. 17D, the entangle level c is 1.0. As the entanglement level c is increased, the region of blending shrinks, becoming a hard intersection when the entanglement level c is 1.0, as shown in FIG. 14D.

Clipping Planes

The soft occlusion methods as described herein may be applied to clipping planes. A clipping plane may be viewed as a plane that defines where an object to be rendered from a set of surfaces is to be "clipped so that an interior portion of the object is rendered. Generally speaking, points of the object formed by the surfaces in front of the clipping plane (i.e., between the clipping plane and the camera) are not rendered, while points on the object behind the clipping plane are rendered.

A set of surfaces to be rendered in an image, and a clipping plane to be applied to the set of surfaces, may be obtained. Depth probability density functions may be assigned to the clipping plane and to the surfaces. The image may then be rendered from the surfaces and the clipping plane according to the depth probability density functions of the surfaces and the depth probability density function of the clipping plane. The rendered image shows an interior region of an object composed of the rendered surfaces revealed by applying the clipping plane to the surfaces. However, since a depth probability density function is used in rendering the clipping plane, the cut of the object made by the clipping plane is rendered "softly," as in the generally described soft occlusion methods, instead of being rendered as a hard cross-section as would be the case using conventional rendering techniques.

Example Soft Occlusion Module

FIG. 18 illustrates an example soft occlusion module according to some embodiments. The soft occlusion methods as described herein, for example as illustrated in FIGS. 5A and 5B, FIG. 9, and FIG. 16, may be implemented in a soft occlusion module 600. Two or more surfaces 620 to be rendered may be obtained. Other input 622 may be obtained; for example, input specifying a degree of correlation c between two correlated surfaces. Note that one or more clipping planes may also be obtained. Depth probability density functions may be assigned to the surfaces 620 by the soft occlusion module 600. In some embodiments, other input 622 may specify or otherwise indicate the depth probability density functions to be used. An image 630 is rendered from the two or more surfaces according to the depth probability density functions of the surfaces. To render the image 630 from the surfaces 620 according to the depth probability density functions of the surfaces 620, the expected color contribution of each surface 620 is computed according to the depth probability density functions of the surfaces 620. In some embodiments, an implementation of a method for analytic soft occlusion 602 may be used to compute the expected color contribution of each surface 620. An example of an analytic soft occlusion method is shown in FIG. 9. In some embodiments, an implementation of a method for stochastic soft occlusion 604 may be used to compute the expected color contribution of each surface 620. An example of a stochastic soft occlusion method is shown in FIG. 16. As indicated at 124, the expected color contributions of the surfaces 620 may be summed to generate expected color for the image 630.

The output rendered image 630 may be displayed to a display device 640 and/or stored to a storage device 650.

Example System

Various components of embodiments of methods for rendering graphics using soft occlusion may be executed on one or more computer systems, which may interact with various other devices. One such computer system is illustrated by FIG. 19. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for rendering graphics using soft occlusion may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for methods for rendering graphics using soft occlusion, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 19, memory 720 may include program instructions 725, configured to implement embodiments of methods for rendering graphics using soft occlusion as described herein, and data storage 735, comprising various data accessible by program instructions 725. In one embodiment, program instructions 725 may include software elements of methods for rendering graphics using soft occlusion as illustrated in the above Figures. Data storage 735 may include data that may be used in embodiments. In other embodiments, other or different software elements and/or data may be included.

Those skilled in the art will appreciate that computer system 700 is merely illustrative and is not intended to limit the scope of methods for rendering graphics using soft occlusion as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    obtaining, by a computing device, two or more surfaces to be rendered in an image and a clipping plane to be applied to the surfaces, at least one of the surfaces occluding at least a portion of at least one of the other surfaces;
    assigning depth probability density functions to the surfaces and the clipping plane; and
    rendering the image from the two or more surfaces and the clipping plane according to the depth probability density functions of the surfaces and the depth probability function of the clipping plane, including:
        computing the expected color contribution of each surface according to the depth probability density functions of the surfaces; and
        summing the expected color contributions of the surfaces to generate expected color for the image.

2. The method as recited in claim 1, wherein computing the expected color contribution of each surface according to the depth probability density functions of the surfaces comprises:
    firing multiple rays at each of a plurality of points in the image from a camera position;
    for each ray fired at each of the plurality of points:
        generating a random depth scale factor relative to the camera position for each surface intersected by the ray; and
        calculating an expected color for the point according to the random depth scale factors for the ray; and
    for each point on each surface of the image, averaging the expected colors for each ray fired at the point to generate an expected color contribution for the point.

3. The method as recited in claim 2, wherein the generated random depth scale factor for a given ray is different for at least two surfaces intersected by the ray.

4. The method as recited in claim 2, wherein two or more of the surfaces are correlated, and generating the random depth scale factor relative to the camera position for each surface intersected by the ray comprises, for rays that intersect at least two correlated surfaces, generating a correlated random depth scale factor for each correlated surface intersected by the ray.

5. The method as recited in claim 4, wherein the correlated random depth scale factor for two correlated surfaces is generated according to an entanglement value c, where c specifies a degree of correlation between the two correlated surfaces.

6. The method as recited in claim 5, where c is variable within a range of 0.0 to 1.0 to specify the degree of correlation between the two correlated surfaces.

7. The method as recited in claim 2, further comprising:
    for each ray fired at each of the plurality of points, calculating a shaded value for the point; and
    for each point on each surface of the image, averaging the shaded value for each ray fired at the point to generate a shaded value for the point.

8. The method as recited in claim 1, wherein rendering the image from the two or more surfaces further comprises computing shadows for the image.

9. The method as recited in claim 1,
    wherein the rendered image shows an interior region of an object composed of the rendered surfaces revealed by applying the clipping plane to the surfaces.

10. A system, comprising:
one or more processors; and
a memory comprising program instructions, wherein the program instructions are executable by the one or more processors to perform operations comprising:
obtaining two or more surfaces to be rendered in an image and a clipping plane to be applied to the surfaces, at least one of the surfaces occluding at least a portion of at least one of the other surfaces;
assigning depth probability density functions to the surfaces and to the clipping plane; and
rendering the image from the two or more surfaces and the clipping plane according to the depth probability density functions of the surfaces and the depth probability function of the clipping plane, including:
computing the expected color contribution of each surface according to the depth probability density functions of the surfaces; and 'summing the expected color contributions of the surfaces to generate expected color for the image.

11. The system as recited in claim 10, wherein computing the expected color contribution of each surface according to the depth probability density functions of the surfaces comprises:
firing multiple rays at each of a plurality of points in the image from a camera position;
for each ray fired at each of the plurality of points:
generating a random depth scale factor relative to the camera position for each surface intersected by the ray; and
calculating an expected color for the point according to the random depth scale factors for the ray; and
for each point on each surface of the image, averaging the expected colors for each ray fired at the point to generate an expected color contribution for the point.

12. The system as recited in claim 11, wherein the operations further comprise:
for each ray fired at each of the plurality of points, calculating a shaded value for the point; and
for each point on each surface of the image, averaging the shaded value for each ray fired at the point to generate a shaded value for the point.

13. The system as recited in claim 11, wherein two or more of the surfaces are correlated, and generating the random depth scale factor relative to the camera position for each surface intersected by the ray comprises, for rays that intersect at least two correlated surfaces, generating a correlated random depth scale factor for each correlated surface intersected by the ray.

14. The system as recited in claim 10, wherein the rendered image shows an interior region of an object composed of the rendered surfaces revealed by applying the clipping plane to the surfaces.

15. The system as recited in claim 10, wherein at least one of the one or more processors is a graphics processing unit (GPU).

16. A computer-readable storage device storing program instructions, wherein the program instructions are computer-executable to implement operations comprising:
obtaining two or more surfaces to be rendered in an image and a clipping plane to be applied to the surfaces, at least one of the surfaces occluding at least a portion of at least one of the other surfaces;
assigning depth probability density functions to the surfaces and the clipping plane; and
rendering the image from the two or more surfaces and the clipping plane according to the depth probability density functions of the surfaces and the depth probability function of the clipping plane, including:
computing the expected color contribution of each surface according to the depth probability density functions of the surfaces; and
summing the expected color contributions of the surfaces to generate expected color for the image.

17. The computer-readable storage device as recited in claim 16, wherein computing the expected color contribution of each surface according to the depth probability density functions of the surfaces comprises:
firing multiple rays at each of a plurality of points in the image from a camera position;
for each ray fired at each of the plurality of points:
generating a random depth scale factor relative to the camera position for each surface intersected by the ray; and
calculating an expected color for the point according to the random depth scale factors for the ray; and
for each point on each surface of the image, averaging the expected colors for each ray fired at the point to generate an expected color contribution for the point.

18. The computer-readable storage device as recited in claim 17, wherein two or more of the surfaces are correlated, and generating a random depth scale factor relative to the camera position for each surface intersected by the ray comprises, generating a correlated random depth scale factor for each correlated surface intersected by the ray.

19. The computer-readable storage device as recited in claim 17, wherein the operations further comprise:
for each ray fired at each of the plurality of points, calculating a shaded value for the point; and
for each point on each surface of the image, averaging the shaded value for each ray fired at the point to generate a shaded value for the point.

20. The computer-readable storage device as recited in claim 16, wherein the rendered image shows an interior region of an object composed of the rendered surfaces revealed by applying the clipping plane to the surfaces.

* * * * *

UNITED STATES PATENT AND TRADEMARK OFFICE
CERTIFICATE OF CORRECTION

PATENT NO. : 8,698,799 B2  
APPLICATION NO. : 12/689919  
DATED : April 15, 2014  
INVENTOR(S) : Miller et al.

Page 1 of 1

It is certified that error appears in the above-identified patent and that said Letters Patent is hereby corrected as shown below:

In the Claims

Column 21, Line 19, after "...surfaces; and" delete "'summing" and insert -- summing --, therefor.

Signed and Sealed this  
Eighth Day of July, 2014

Michelle K. Lee  
*Deputy Director of the United States Patent and Trademark Office*